(12) United States Patent
Kukino

(10) Patent No.: US 7,520,701 B2
(45) Date of Patent: Apr. 21, 2009

(54) CBN CUTTING TOOL FOR HIGH-QUALITY, HIGH-EFFICIENCY CUTTING

(75) Inventor: Satoru Kukino, Hyogo (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 299 days.

(21) Appl. No.: 10/591,898

(22) PCT Filed: Mar. 14, 2006

(86) PCT No.: PCT/JP2006/005014

§ 371 (c)(1),
(2), (4) Date: Jan. 23, 2007

(87) PCT Pub. No.: WO2006/098317

PCT Pub. Date: Sep. 21, 2006

(65) Prior Publication Data

US 2008/0025802 A1 Jan. 31, 2008

(30) Foreign Application Priority Data

Mar. 16, 2005 (JP) .............................. 2005-074983

(51) Int. Cl.
*B23B 27/14* (2006.01)
*B23B 1/00* (2006.01)

(52) U.S. Cl. .................. 407/119; 407/113; 428/698

(58) Field of Classification Search .............. 407/107, 407/113–117, 118, 119; 428/698
See application file for complete search history.

(56) References Cited

U.S. PATENT DOCUMENTS

| 5,707,185 | A | * | 1/1998 | Mizutani | ................. | 407/42 |
| 5,712,030 | A | | 1/1998 | Goto et al. | | |
| 6,065,377 | A | * | 5/2000 | Harada et al. | ................. | 82/1.11 |
| 6,612,786 | B1 | * | 9/2003 | Kanada et al. | ............... | 407/118 |
| 6,716,544 | B2 | * | 4/2004 | Uesaka et al. | ............... | 428/698 |

FOREIGN PATENT DOCUMENTS

| EP | 703032 A1 | * | 3/1996 |
| EP | 1859882 A1 | * | 11/2007 |
| JP | 64-34103 | | 3/1989 |
| JP | 1-252307 A | | 10/1989 |

(Continued)

*Primary Examiner*—Willmon Fridie
(74) *Attorney, Agent, or Firm*—McDermott Will & Emery LLP

(57) ABSTRACT

It is an object to provide a CBN cutting tool using cBN-based sintered bodies which shows high resistance to chipping even when a hard ferric workpiece which is difficult to cut is cut at a high feed rate for high-speed, high-efficiency machining, and which can provide a machined surface that shows superior surface roughness, and improved fatigue life and sealability. A cBN-based sintered body of a cutting tip has an arcuate nose 5, a rake face 6, flanks 7 and a negative land 9. One of the cutting edges 10 defined between the negative land 9 and the flanks 7 that serves as an end cutting edge forms an inclination angle 6' of not less than 20 degrees and not more than 35 degrees with respect to the rake face. Further, the cutting edges 10 are positioned such that they are the lowest at the apex P of the arcuate nose and gradually rise from the apex P toward two points Q1 and Q2, respectively.

9 Claims, 6 Drawing Sheets

FOREIGN PATENT DOCUMENTS

| | | |
|---|---|---|
| JP | 8-206902 A | 8/1996 |
| JP | 8-318411 A | 12/1996 |
| JP | 11-347807 A | 12/1999 |
| JP | 2003-175408 A | 6/2003 |
| JP | 2005-52911 A | 3/2005 |

* cited by examiner

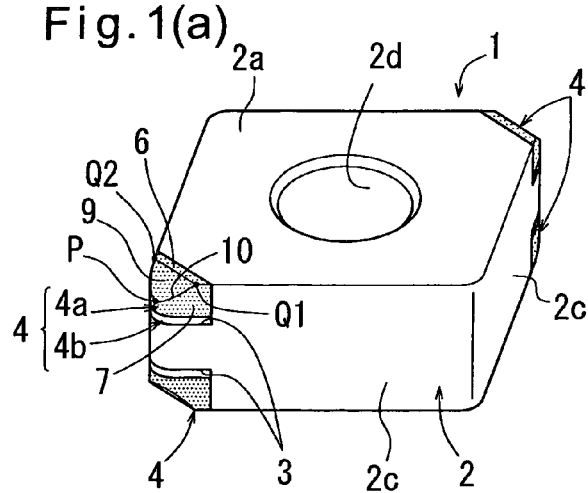
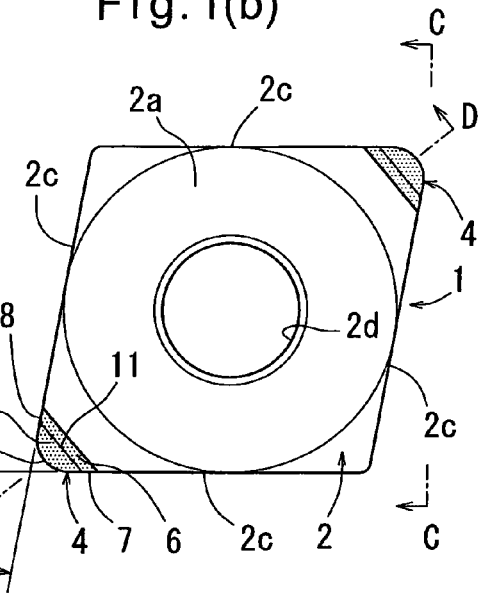
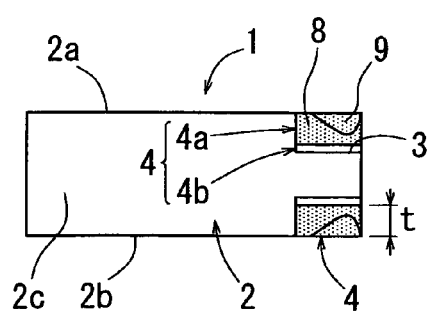
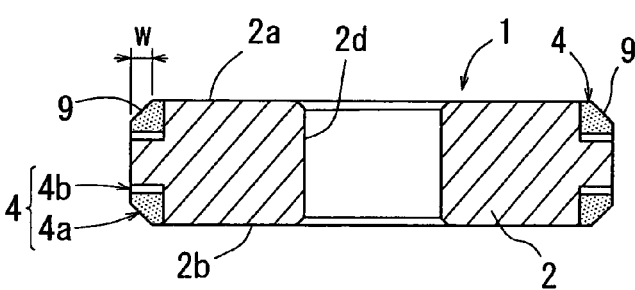
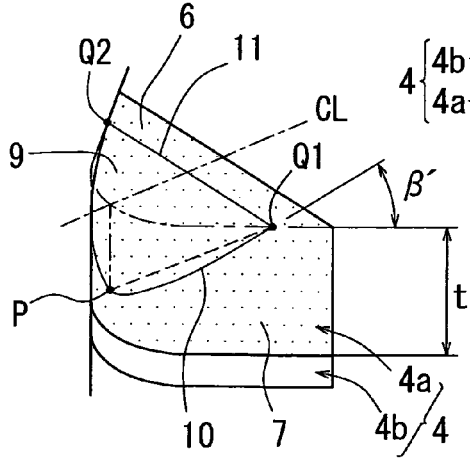

us 7,520,701 B2

CBN CUTTING TOOL FOR HIGH-QUALITY, HIGH-EFFICIENCY CUTTING

RELATED APPLICATIONS

This application is the U.S. National Phase under 35 U.S.C. § 371 of International Application No. PCT/JP2006/305014, filed on Mar. 14, 2006, which in turn claims the benefit of Japanese Application No. 2005-074983, filed on Mar. 16, 2005, the disclosures of which Applications are incorporated by reference herein.

TECHNICAL FIELD

This invention relates to a cutting tool having its cutting edges formed of cBN—(cubic boron nitride) based sintered bodies and used to cut a hard ferric workpiece which is difficult to cut at a high speed and with high efficiency, and more specifically, a CBN cutting tool which is high in resistance to chipping even at a high feed rate, and provides a cut surface that is superior in surface roughness, fatigue life and sealability.

BACKGROUND ART

CBN cutting tools having their cutting edges formed of cBN-based sintered bodies can perform cutting with high efficiency for a prolonged period or time, and are far more adaptive and environmentally friendly than grinding tools, because the cBN-based sintered bodies forming their cutting edges are chemically stable and high in hardness. Thus, CBN cutting tools are known as tools which make it possible to replace grinding of ferric workpieces that are difficult to grind, particularly workpieces made of hardened steel, with cutting. Today, as a result of increased rigidity of machine tools and improvement in the material of cBN-based sintered bodies, CBN cutting tools are being used for rough machining of e.g. vehicle transmission parts of steel at a feed rate f exceeding 0.3 mm/rev after hardening, and even for finishing of such parts, in which a surface roughness of 3.2 micrometers in ten point height of irregularities (Rz) is required.

Today, due to increasing tendencies to produce goods in greater varieties, each variety in a smaller lot, and increasing environmental concerns, CBN cutting tools which can be used for further high-efficiency machining, in which the cutting resistance increases, and for dry machining, in which the temperature of the cutting edges tend to increase, are desired. It is further desired that such CBN cutting tools exhibit satisfactory cutting performance with a minimum area of the expensive cBN-based sintered bodies.

In conventional CBN cutting tools, of which each cBN-based sintered body has an arcuate nose, flanks, a rake face and a chamfer having a uniform width and extending parallel to the cutting edge, it is possible to increase their durability against the cutting load in the rotational direction of the workpiece (i.e. direction of the principal cutting force) to some extent by increasing the chamfer width CW and chamfer angle γ (see FIG. 9) of the chamfer 13 (typically to 0.1 to 0.2 mm and 15 to 45 degrees, respectively), as disclosed in Patent publications 1 and 2. But there are few effective ways to increase the durability against the cutting load in the feed direction of the tool or in the direction of the thrust force, which is produced during high-efficiency machining at a high feed rate or with a large depth of cut. In fact, increasing the radius of curvature of the nose is practically the only way to increase such durability.

Cutting tools having their cBN-based sintered bodies brazed to the substrate are widely used because it is possible to minimize the area of the cBN-based sintered bodies and thus the tool cost is low. In such cutting tools, in order to ensure sufficient brazing strength, the radius of curvature of the nose has to limited to up to about 2.0 mm. Thus, even if the radius of curvature of the nose is increased to the upper limit of 2.0 mm, the durability against large stresses applied to the cutting edge during high-efficiency machining at a high feed rate is not sufficient. Moreover, when subjecting hardened steel workpieces having a complicated shape such as vehicle transmission parts to copying and recess forming, it is often necessary to use inserts of which the noses have a radius of curvature of 0.8 mm or less.

Further, it is urgently required today to develop cutting tools which can form a high-quality machined surface on a workpiece during a finishing step which determines the fatigue strength and sealability of the machined surface, instead of by grinding, which is limited in terms of machining efficiency and flexibility.

In conventional such cutting tools, the geometric shape of the cutting edge is transferred onto the machined surface, so that it was inherently difficult to obtain a desired surface roughness. Also, in such conventional cutting tools, it was impossible to positively utilize compressive stresses, which improve the fatigue life of the workpiece.

In order to solve these problems, Patent publication 3 proposes a CBN cutting tool for high-efficiency, high-precision machining which includes cutting tips each having an arcuate nose and an end cutting edge having a wiper edge (12 in FIG. 10). Such tools are hereinafter referred to as wiper tools.

Theoretically, such a wiper tool can provide good surface roughness while the feed rate is below the width WW of the wiper edge. But in high-efficiency machining at a feed rate or with a large depth of cut, the durability against the cutting load in the feed direction of the tool or in the direction of the thrust force is no higher than the durability achieved by conventional tools having arcuate noses. Thus, the cutting edges tend to chip.

For the properties of the machined surface too, in the case of a wiper tool, due to the burnishing action in which feed marks M (see FIG. 3(*a*)) formed by the transfer of the shape of the cutting edge are repeatedly pressed and flattened, tensile stresses produced by thermal stresses relax, so that residual stresses in the rotational direction of the workpiece tends to be suppressed compared to conventional tools with arcuate noses.

For residual stresses in the tool feed direction, however, their levels are often not substantially different between cutting using wiper tools and cutting using tools with arcuate noses. Thus, it was impossible to use wiper tools to machine sliding parts which are used in hostile environments, and parts for which complete sealability is required.

Patent document 1: JP utility model publication 64-34103A

Patent document 2: JP patent publication 8-318411A

Patent document 3: JP patent publication 2003-175408A

DISCLOSURE OF THE INVENTION

Object of the Invention

An object of the present invention is to provide a CBN cutting tool using cBN-based sintered bodies which shows high resistance to chipping even when a hard ferric workpiece which is difficult to cut is cut at a high feed rate for high-speed, high-efficiency machining, and which can provide a machined surface that shows superior surface roughness, and improved fatigue life and sealability, and a method of turning such a workpiece using such a cutting tool.

Means to Achieve the Object

According to the present invention, there is provided a CBN cutting tool for high-quality, high-efficiency cutting comprising cutting portions formed by cBN-based sintered bodies, characterized in that each of the cBN-based sintered bodies has an end flank, a side flank, an arcuate nose, a rake face and a negative land formed between the rake face and the arcuate nose, the negative land and the rake face defining a ridgeline therebetween which extends from point Q1 at which the end flank, rake face and negative land intersect each other to point Q2 at which the side flank, rake face and negative land intersect each other, the end flank and the negative land defining a first cutting edge therebetween, the side flank and the negative land defining a second cutting edge therebetween, the first and second cutting edges extending from an apex P of the arcuate nose to points Q1 and Q2, respectively, the first and second cutting edges being the lowest relative to the rake face at the apex P and rising toward points Q1 and Q2, respectively, and wherein a straight line connecting the apex P and point Q1 forms an inclination angle $\beta'$ of not less than 20 degrees and not more than 35 degrees with respect to the rake face.

The cBN-based sintered bodies, which define cutting edges, preferably contain 45 to 99.9 percent by volume of cBN.

Preferred embodiments of the CBN cutting tool according to the present invention, and a preferred method of using it are described below in a detailed manner.

From another aspect of the invention, there is provided a method of turning a workpiece having a rotation axis using the above-described CBN cutting tool of any of claims 1 to 6, wherein the CBN cutting tool is cut into the workpiece at a feed rate of not less than 0.1 mm/rev and not more than 0.5 mm/rev, preferably not less than 0.15 mm/rev and not more than 0.5 mm/rev, with the CBN cutting tool positioned such that the cutting edge inclination angle and the side rake angle are both negative, the end clearance angle, side clearance angle and end cutting edge angle are all positive, the downward inclination angle $\beta$ of the first cutting edge used as the end cutting edge is 20 to 35 degrees with respect to the rake face, and the apex P is spaced downwardly by not less than 0.5 mm and not more than 1.5 mm, preferably not less than 0.7 mm and not more than 1.2 mm, from a plane parallel to the rake face and containing the rotation axis of the workpiece.

Advantages of the Invention

According to the present invention, a special negative land is formed between the arcuate nose, which is formed of a cBN-based sintered body, and the rake face. The negative land defines cutting edges on both sides thereof so that the downward distance of the cutting edges are the largest at the apex of the arcuate nose, and the cutting edges gradually rise toward points Q1 and Q2, respectively. Thus, during use, in either of the rotational direction of the workpiece and the tool feed direction, it is possible to form an obtuse cutting edge that can perform the burnishing action.

Known chamfers are parallel to the cutting edge and have a uniform width. In contrast, the negative land of the tool according to the present invention lowers toward the apex of the arcuate nose on both sides of the end and side flanks. Thus, both in the rotational direction of the workpiece and the tool feed direction, an obtuse cutting edge of which the height changes three-dimensionally is formed. This ensures strength of the tool sufficient to withstand large stresses.

By using the cutting tool with its position determined as defined in the method of the present invention, as viewed in the direction of the principal cutting force, as shown in FIG. 2, the cutting edge 10 as the end cutting edge shifts inwardly from the position of the cutting edge of a conventional tool with an arcuate nose. Thus, if the tool is fed in the direction shown by the arrow A in FIG. 2, the portion of the cutting edge 10 enclosed in a circle of a phantom line serves as a wiper edge 10a.

FIG. 3(a) shows how the cutting edge of a conventional tool with an arcuate nose and the cutting edge of the tool according to the invention are fed. FIG. 3(b) is an enlarged view of feed marks M (ten point height of irregularities Rz) on the machined surface. One-dot chain lines in FIGS. 3(a) and 3(b) show the locus of the cutting edge of the arcuate nosed conventional tool. Solid lines in FIGS. 3(a) and 3(b) show the locus of the tool of the present invention. As is apparent from these lines, a wiper edge is formed during use, which improves the surface roughness of the machined surface compared to the arcuate nosed conventional tool, which has no wiper edge.

BRIEF DESCRIPTION OF THE DRAWINGS

FIG. 1(a) is a perspective view of a cutting tool according to the present invention;

FIG. 1(b) is a plan view of the tool of FIG. 1(a);

FIG. 1(c) is a side view taken along line C-C of FIG. 1(b);

FIG. 1(d) is a side view taken along line D-D of FIG. 1(b);

FIG. 1(e) is an enlarged perspective view of a cutting tip of the tool of FIG. 1(a);

Figure 2:
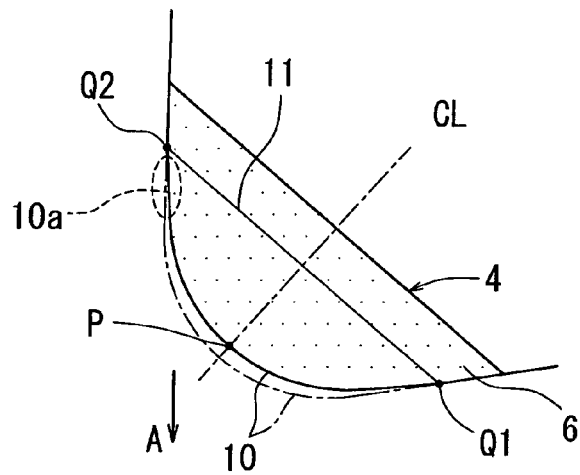
FIG. 2 shows a cutting edge having a negative land and a cutting edge having no negative land, as viewed in the direction of the principal cutting force.
Figure 3A:
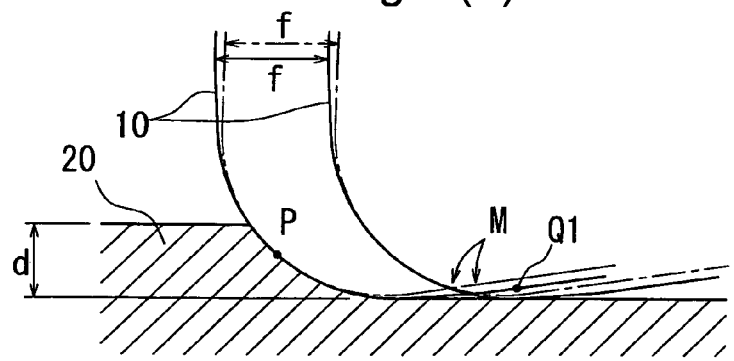
FIG. 3(a) shows loci of cutting edges of the conventional tool and the tool according to the invention, while they are being fed.
Figure 3B:
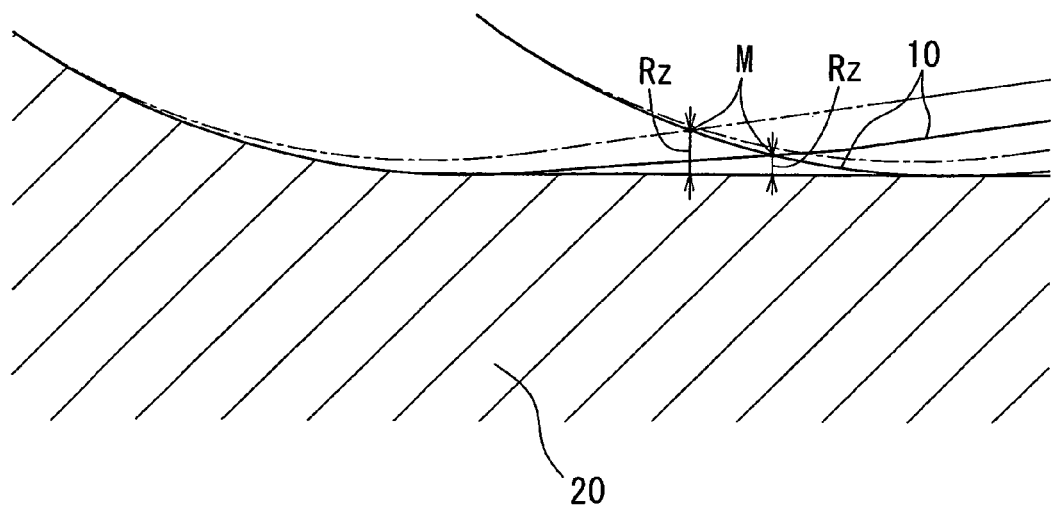
FIG. 3(b) shows feed marks formed by the conventional tool and the tool according to the invention.

| DESCRIPTION OF REFERENCES | |
|---|---|
| 1 | Cutting tool |
| 2 | Substrate of cemented carbide |
| 2a | Top surface |
| 2b | Bottom surface |
| 2c | Side face |
| 2d | Clamp hole |
| 3 | Seat |
| 4 | Cutting tip |
| 4a | cBN-based sintered body |
| 4b | Back metal layer |
| 5 | Arcuate nose |
| 6 | Rake face |
| 7 | End flank |
| 8 | Side flank |
| 9 | Negative land |
| 9a, 9b | Surfaces inclined in opposite directions |
| 10 | Cutting edge |
| 11 | Ridgeline between negative land and rake face |
| 12 | Conventional wiper edge |
| 13 | Chamfer |
| 20 | Workpiece |

BEST MODE FOR EMBODYING THE INVENTION

Now referring to FIGS. 1 to 7, CBN cutting tools embodying the present invention are described.

The CBN cutting tool 1 shown in FIG. 1 is a diamond-shaped negative insert including a substrate 2 made of cemented carbide and formed with two seats 3 at each of the two diagonally opposed acute corners thereof. On each seat 3, a cutting tip 4 comprising a cBN-based sintered body is mounted by brazing. The four cutting tips 4 can be used alternately for cutting. Each cutting tip 4 has an arcuate nose 5, rake face 6, end flank 7, side flank 8 and negative land 9. Since each cutting tip 4 is symmetrical with respect to its centerline, the end flank 7 and the side flank 8 may serve as a side flank and a end flank, respectively, depending on how the insert is used.

The substrate 2 has parallel top and bottom surfaces 2a and 2b and four sides 2c that intersect the top and bottom surfaces 2a and 2b at a right angle, and is formed with a clamp hole 2d extending centrally therethrough between the top and bottom surfaces 2a and 2b. The top and bottom surfaces 2a and 2b are of the same structure. Thus, the tool 1 can be used upside down with the surfaces 2a and 2b as bottom and top surfaces, respectively. Each cutting tip 4 shown comprises a cBN-based sintered body 4a, and a back metal layer 4b made of cemented carbide. But the cutting tips according to the present invention may each consist only of a cBN-based sintered body. The corner of any of the four cutting tips 4 can be used for cutting. The cBN-based sintered bodies forming the cutting tips 4 contain 45 to 99.9 percent by volume of cBN so that the cutting tips can cut hardened steel with high efficiency.

The negative land 9 of each cutting tip 4 intersects any of the rake face 6 and end and side flanks 7 and 8 at an obtuse angle, and is arranged such that a ridgeline 10 as an end cutting edge (straight line P-Q1 extending between apex P and point Q1 as viewed from one side of the insert) forms an angle β' of not less than 20 degrees and not more than 35 degrees with respect to the rake face 6. The ridgeline 10 as the end cutting edge, which is defined by the negative land 9 and the end flank 7, is the lowest at the apex P and rises gradually toward point Q1 at which the rake face 6, negative land 9 and end flank 7 intersect each other. Similarly, the ridgeline 10 as the side cutting edge, which is defined by the negative land 9 and the side flank 8, is the lowest at the apex P and rises gradually toward point Q2 at which the rake face 6, negative land 9 and side flank 8 intersect each other. The ridgeline 11 defined by the negative land 9 and the rake face 6 extends between points Q1 and Q2.

In order to provide a desired economical tool, the cutting tips should be as small as possible. For this purpose, each cutting tip is preferably dimensioned as follows:

Radius of curvature of the arcuate nose 5: not less than 0.4 mm and not more than 1.6 mm Apex angle α of the arcuate nose 5: 55 to 90 degrees Inclination angle β': 20 to 35 degrees Width W of the negative land 9 along the bisector of the apex angle α of the arcuate nose 5: not less than 0.5 mm and not more than 2.0 mm Under ISO, inserts with alternately usable cutting tips are classified into four types according to the nose apex angle, i.e. classes D, T, C and S (of which the nose apex angles are 55, 60, 80 and 90 degrees, respectively). If the present invention is applied to an insert that is classified in one of these types, its cutting tips are preferably dimensioned such that the arcuate nose 5 has a radius of curvature of not less than 0.8 mm and not more than 1.2 mm, the inclination angle β' is not less than 25 degrees and not more than 32 degrees, and the width W of the negative land 9 (its maximum width along the bisector of the apex angle α) is not less than 0.5 mm and not more than 1.5 mm.

The cutting tips 4 may consist only of a cBN-based sintered body or may comprise a cBN-based sintered body and a back metal layer of e.g. cemented carbide bonded to the cBN-based sintered body. The cutting tips 4 may be fixed to the substrate 2 of cemented carbide by means other than brazing. For example, if the cutting tips 4 can be stably held by the substrate 2, they may be fixed to the substrate 2 by sintering the cutting tips and the substrate together, press-fitting, shrinkage fitting or expansion fitting or by means of a self-gripping clamp mechanism.

Figure 4:
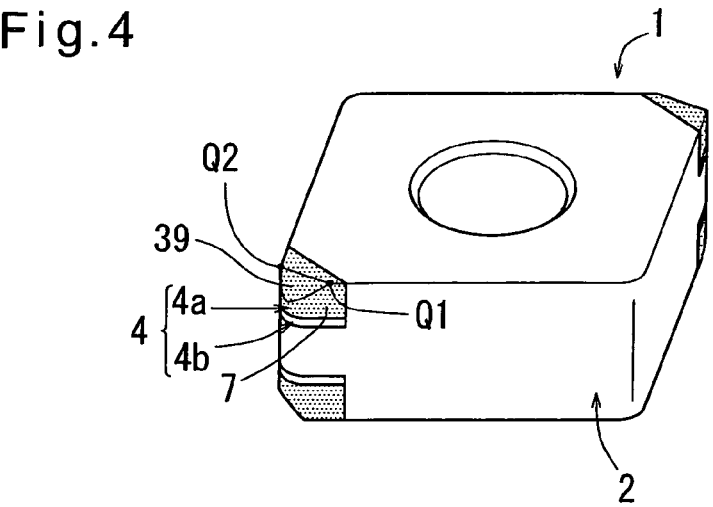
FIG. 4 is a perspective view of a tool according to another embodiment of the present invention.

For sufficient durability, the cBN-based sintered bodies of the cutting tips 4 should have a thickness t of not less than 0.8 mm and not more than 1.5 mm. If each cutting tip 4 is brazed to the substrate 2 of cemented carbide, the brazing area is preferably not less than 2.5 mm$^2$ and not more than 5 mm$^2$ for higher bond strength and smaller size and thus lower cost. The cutting tips may be asymmetrical with respect to the bisector of the nose apex angle as shown in FIG. 4. But cutting tips that are symmetrical with respect to the bisector of the nose apex angle as shown in FIG. 1 are preferable because such cutting tips can be used not only for outer peripheral cutting but also end surface cutting.

Figure 5:
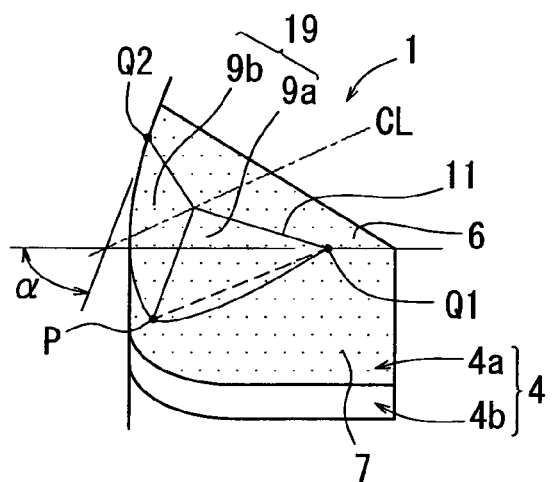
FIG. 5 is a perspective view of a tool according to still another embodiment of the invention.
Figure 6:
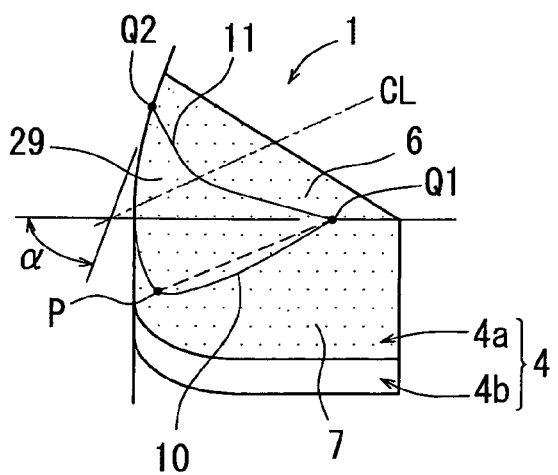
FIG. 6 is a perspective view of a tool according to a further embodiment of the invention.

FIGS. 5 and 6 show different types of symmetrical cutting tips embodying the present invention. The cutting tip of FIG. 5 has a negative land 19 comprising two surfaces 9a and 9b intersecting each other along the bisector of the nose apex angle α and inclined in opposite directions to each other. The surfaces 9a and 9b are symmetrical with respect to the bisector CL of the nose apex angle α, and both are lowest at the apex P of the arcuate nose 5. The cutting tip of FIG. 6 is a modification of the cutting tip of FIG. 5 and includes a curved surface as a negative land 29 which is symmetrical with respect to the bisector CL of the nose apex angle a of the arcuate nose as viewed from the top of the insert.

Among cutting tools having alternately usable cutting tips are ones in which the cemented carbide substrate 2 has a thickness t1 of 3.18 mm, 4.76 mm or 6.35 mm (03, 04 and 05 under ISO, respectively), a clamp hole 2d is formed in the substrate 2 (though the clamp hole is not an essential element), the substrate 2 is dimensioned such that its reference inscribed circle has a diameter of 6.35 mm, 9.525 mm or 12.7 mm, and the cutting tips, which comprise a cBN-based sintered body, have a nose apex angle α of 80 degrees. The concept of the present invention is applicable to such cutting tools, too.

The negative land, which is provided on the rake face at its portion near the arcuate nose, is not limited to a flat one, but may comprise a plurality of surfaces that intersects each other and inclined relative to each other such as the negative land 19 shown in FIG. 5, may be a curved negative land such as the negative land 29 shown in FIG. 6, or may be a surface which is asymmetrical with respect to the bisector CL of the nose apex angle α, such as the negative land 39 shown in FIG. 4. Further, the concept of the present invention is applicable to an insert of which the flank 7 intersects the rake face 6 at an angle greater than 90 degrees or to a square insert, too.

Figure 7:
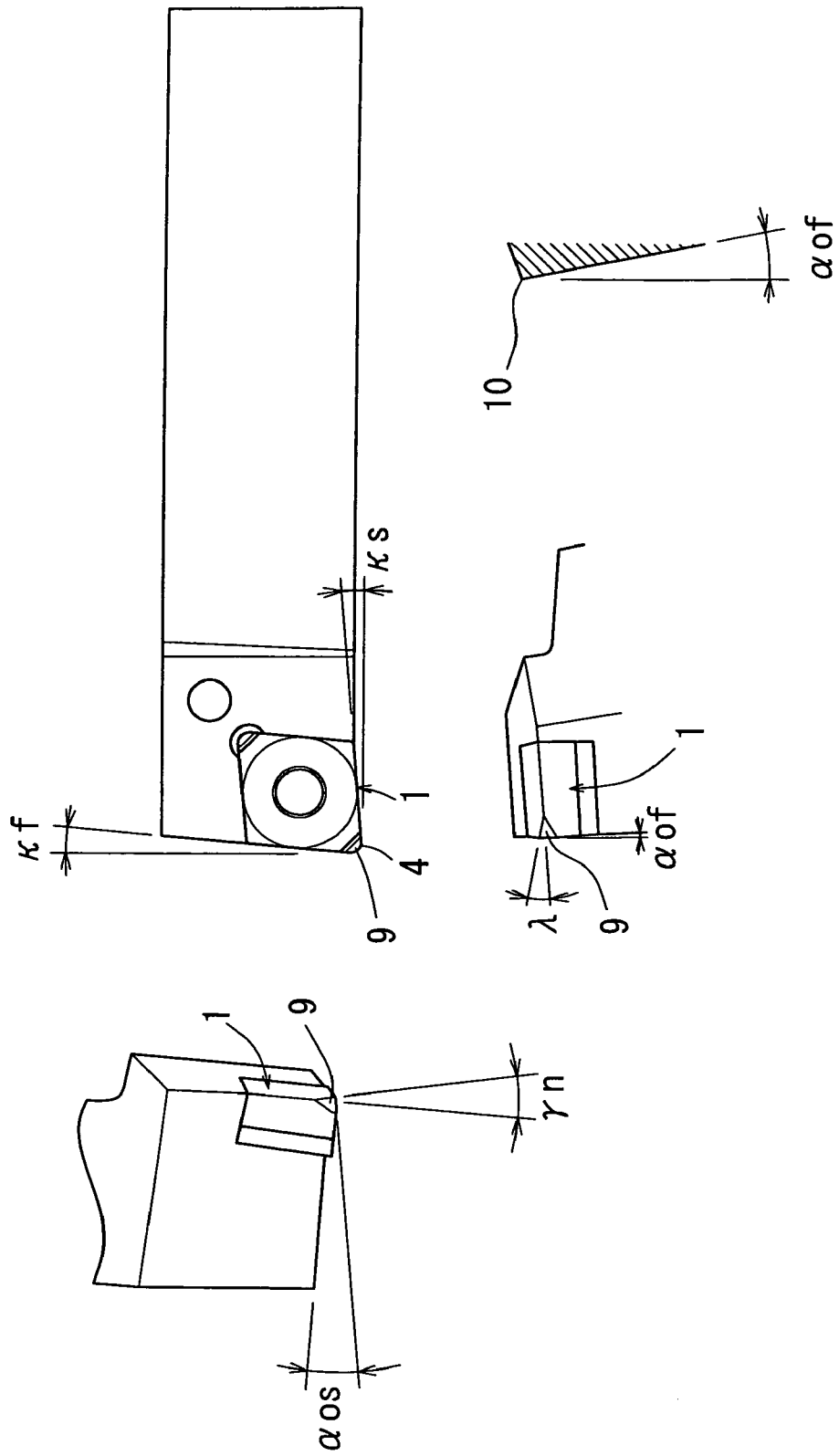
FIG. 7 shows how the tool according to the invention is positioned during use.
Figure 8A:
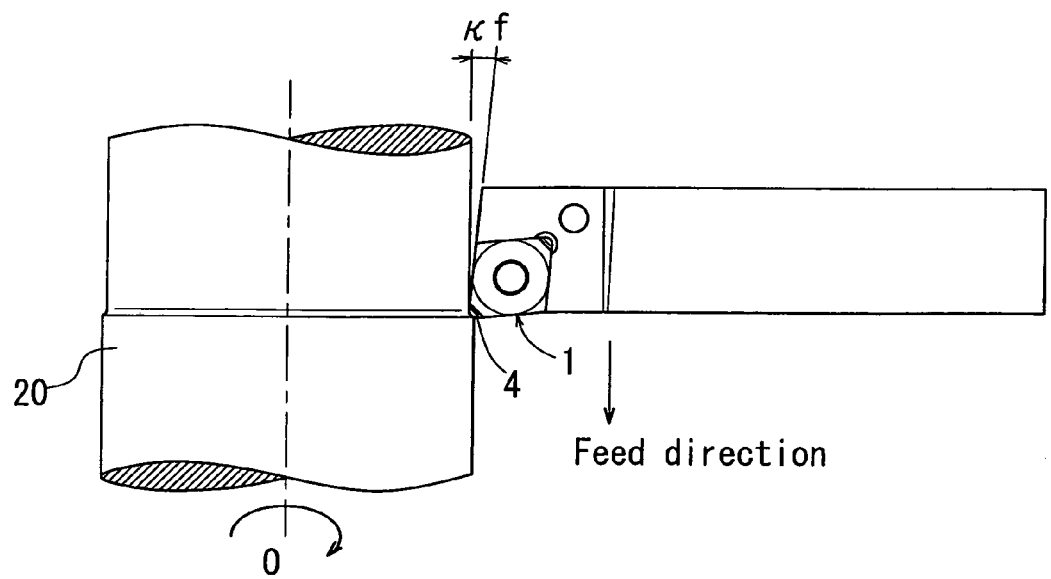
FIG. 8(a) is a schematic plan view of the tool according to the present invention during use.
Figure 8B:
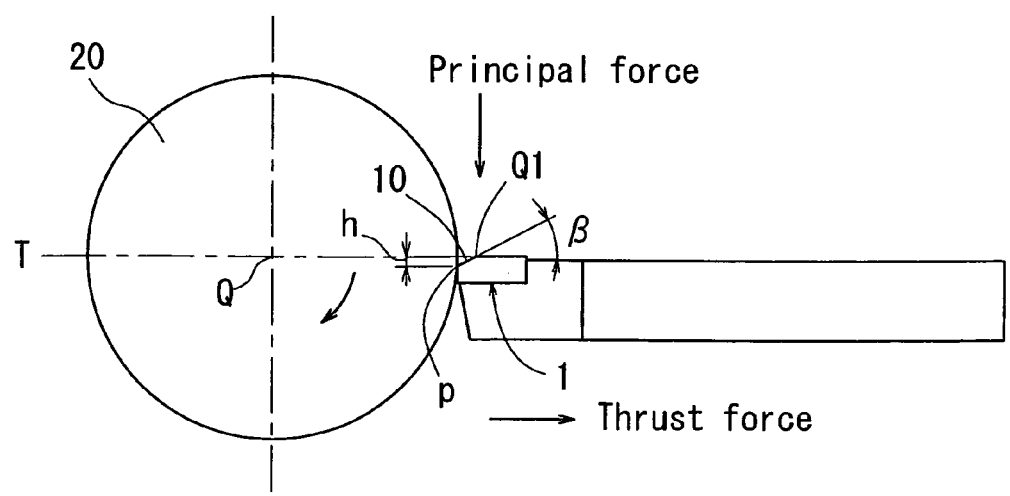
FIG. 8(b) is a schematic end view of the tool according to the present invention during use.
Figure 9A:
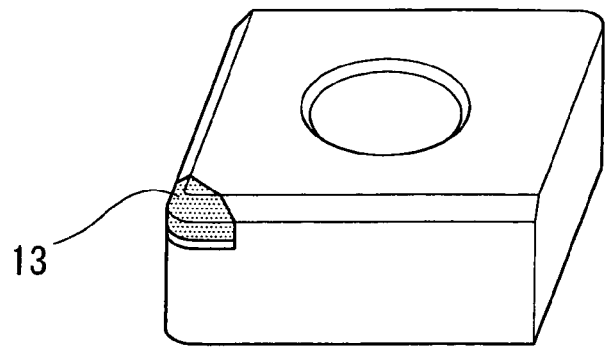
FIG. 9(a) is a schematic perspective view of a conventional tool with arcuate noses and having a chamfer at each cutting tip.
Figure 9B:
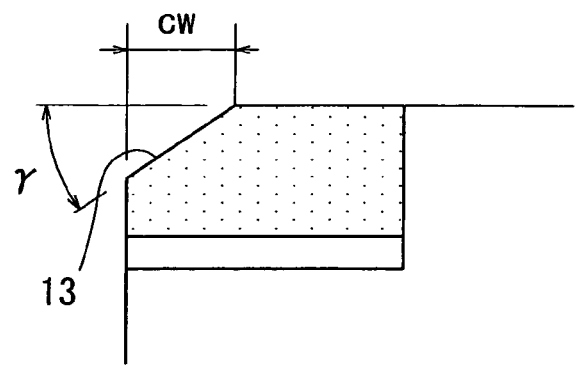
FIG. 9(b) is an enlarged sectional view of one of the cutting tips of the tool of FIG. 9(a)
Figure 10:
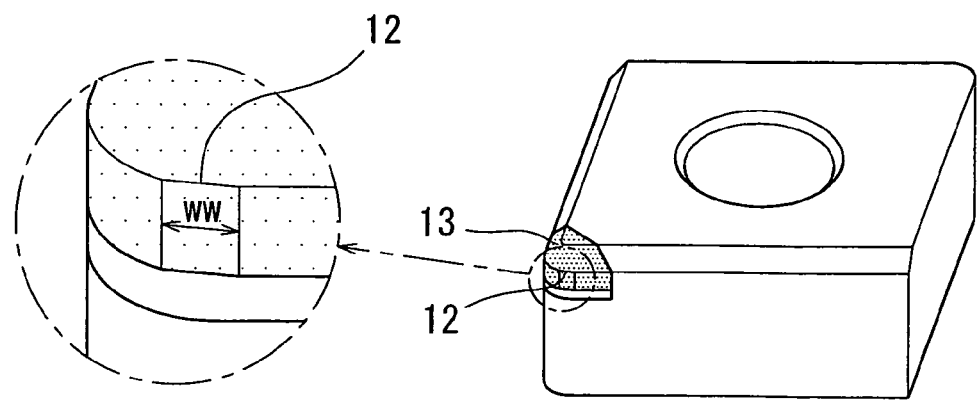
FIG. 10 is a schematic perspective view of a conventional wiper tool.

The CBN cutting tool according to the present invention is used for turning with the cutting tip arranged such that the inclination angle λ of the cutting edge and the side rake angle γn (see FIG. 7) are both negative, the end clearance angle αof, side clearance angle αos, end cutting edge angle κf, and side cutting edge angle κs are all positive, the angle β shown in FIG. 8(b) is 20 to 35 degrees, and the distance h shown in FIG. 8(b) is not less than 0.5 mm and not more than 1.5 mm.

The angle β is the downward inclination angle of the ridge line 10 used as the end cutting edge (portion of the cutting edge extending from the apex P of the arcuate nose to point Q1, i.e. straight line P-Q1 as viewed from one side of the cutting tool), with respect to the rake face 6. If the angle β is less than 20 degrees, a wiper edge cannot be effectively formed. If larger than 35 degrees, the cutting resistance increases, thus making it difficult to improve the resistance to chipping.

The distance h is the downward distance of the apex P of the nose 5 from the plane parallel to the rake face 6 of the insert and containing the rotation axis O of the workpiece 20. By determining the distance h in the range of not less than 0.5 mm and not more than 1.5 mm, both the chipping resistance of the cutting edge and the surface roughness of the workpiece improve. Ordinarily, cutting is not carried out with the apex P located below the abovementioned plane.

The feed rate f of the tool during cutting of this type is preferably set to not less than 0.1 mm/rev and not more than 0.5 mm/rev. More preferably, the feed rate f is set to not less than 0.15 mm/rev and not more than 0.5 mm/rev with the downward distance h, shown in FIG. 8(b), set to not less than 0.7 mm and not more than 1.2 mm. By setting these parameters within the above ranges, the advantages of the invention are achieved to maximum extent.

Detailed examples are now described.

EXAMPLES 1

CBN cutting tool specimen Noss 1 to 39 having cutting portions comprising cBN-based sintered bodies having different shapes were prepared, and evaluated for their cutting abilities.

The cBN-based sintered bodies were formed by mixing together cBN powder and a binder powder comprising TiN and Al in a ball mill made of cemented carbide, and sintering the mixture using an ultrahigh pressure device at 5 GPa and 1500 degrees C. The sintered bodies contained 60 percent by volume of cBN particles having an average particle diameter of 3 micrometers, the balance comprising a Ti compound of which the major component was TiN, Al compounds such as nitrides, borides or oxides of Al, and trace amounts of W and Co compounds.

The cutting tools of Examples 1 are based on insert type tools classified into CNMA120404, CNMA120408, CNMA120412, CNMA120416 and CNMA120420 under ISO, which include cutting tips each comprising a cBN-based sintered body and having a thickness of 1.8 mm, a nose apex angle a of 80 degrees and a bottom length of 4 mm. Some of these cutting tips are directly joined to a steel shank, and the others are joined to a substrate of cemented carbide. The cutting tips have different kinds of conventional chamfers and the negative land that characterizes the present invention at their cutting edges.

Any of the above tools includes cutting tips each comprising a cBN-based sintered body and a back metal layer of cemented carbide and joined to a steel shank or a substrate of cemented carbide. On each cutting tip, after forming a rake face and an arcuate nose by grinding, a chamfer and a negative land were formed by grinding. Before forming the chamber and negative land, the cBN-based sintered bodies of any tool had a thickness of 1.5 mm, the noses of the respective tools had radii of curvature R of 0.8 mm, 1.2 mm, 1.6 mm and 2.0 mm (the last two digits of each type number indicate the radius of curvature of the nose), and the brazing areas of the bottoms of the cutting tips of the respective tools were 3.15 $mm^2$, 2.90 $mm^2$, 2.55 $mm^2$ and 2.10 $mm^2$.

The tools were used as shown in FIG. 8 under the same conditions with the cutting edge inclination angle λ, side rake angle γn, end clearance angle, side clearance angle, end cutting edge angle, and side cutting edge angle set to −5 degrees, −5 degrees, 5 degrees, 5 degrees, 5 degrees and −5 degrees, respectively. The downward distance h of the ridgeline which is used as the end cutting edge, the width W of the negative land, and the downward inclination angle β of this cutting edge were set to values shown in Table 2. Using these tools, the following workpiece was cut under the following conditions.

Workpiece: JIS type: SCR415H outer periphery machining (DIN type: equivalent to 15Cr3); Hardness HRc 58 to 60

Cutting velocity: V=150 m/min

Depth of cut: d=0.2 mm

Feed rate: f=0.3 mm/rev

Type of machining: Continuous machining of the outer periphery of round rod, with no coolant The results of an evaluation test are also shown in Table 1.

TABLE 1

| Specimen No. | Tool shape | Downward inclination angle β ° | Width W of negative land mm | Downward distance h mm | Cutting time to tool breakage min | Surface roughness Rz μm | Residual stress on cut surface of workpiece (circumferential direction) GPa | Residual stress on cut surface of workpiece (axial direction) GPa | Remarks |
|---|---|---|---|---|---|---|---|---|---|
| 1 | CNMA120404 | 0 | — | 0 | 3 | 20.8 | −0.2 | −0.2 | γ: 25°, CW: 0.15 mm |
| 2 | CNMA120408 | 0 | — | 0 | 9 | 12.5 | −0.2 | −0.2 | γ: 25°, CW: 0.15 mm |
| 3 | CNMA120408 | 0 | — | 0.80 | 9 | 12.3 | −0.2 | −0.2 | γ: 25°, CW: 0.15 mm |
| 4 | CNMA120416 | 0 | — | 0 | 11 | 7.5 | −0.3 | −0.2 | γ: 25°, CW: 0.15 mm |
| 5 | CNMA120420 | 0 | — | 0 | 12 | 6.5 | −0.3 | −0.2 | γ: 25°, CW: 0.15 mm |
| 6 | CNMA120408 | 0 | — | 0 | 8 | 10.8 | −0.3 | −0.2 | γ: 45°, CW: 0.15 mm |
| 7 | CNMA120408 | 0 | — | 0 | 10 | 10.8 | −0.3 | −0.2 | γ: 25°, CW: 0.4 mm |
| 8 | CNMA120408 | 0 | — | 0 | 11 | 10.9 | −0.3 | −0.2 | γ: 35°, CW: 0.4 mm |
| 9 | CNMA120408 | 0 | — | 0 | 11 | 11.0 | −0.3 | −0.2 | γ: 45°, CW: 0.4 mm |
| 10 | CNMA120408 | 0 | — | 0.80 | 11 | 11.5 | −0.2 | −0.2 | γ: 45°, CW: 0.4 mm |
| 11 | CNMA120408 | 0 | — | 0 | 9 | 2.5 | −0.4 | −0.3 | WW: 0.5, γ: 25°, CW: 0.15 mm |
| 12 | CNMA120408 | 0 | — | 0 | 7 | 2.7 | −0.5 | −0.3 | WW: 0.5, γ: 45°, CW: 0.4 mm |
| 13 | CNMA120408 | 17.5 | 1.70 | 0.80 | 10 | 10.0 | −0.5 | −0.4 | |
| 14 | CNMA120408 | 20.0 | 1.50 | 0.80 | 15 | 6.0 | −0.6 | −0.5 | |
| 15 | CNMA120408 | 20.0 | 0.80 | 0.80 | 15 | 6.0 | −0.6 | −0.5 | |
| 16 | CNMA120408 | 25.0 | 0.80 | 0.80 | 18 | 5.5 | −0.6 | −0.5 | |
| 17 | CNMA120408 | 35.0 | 0.80 | 0.80 | 20 | 2.8 | −0.7 | −0.5 | |
| 18 | CNMA120408 | 45.0 | 0.80 | 0.80 | 9 | — | — | — | Chattering developed |
| 19 | CNMA120408 | 25.0 | 1.10 | 0.80 | 18 | 5.5 | −0.6 | −0.5 | |
| 20 | CNMA120408 | 25.0 | 1.50 | 0.80 | 18 | 5.5 | −0.6 | −0.5 | |
| 21 | CNMA120408 | 25.0 | 2.00 | 0.80 | 14 | 5.5 | −0.6 | −0.5 | |
| 22 | CNMA120408 | 25.0 | 3.00 | 0.80 | 1 | — | — | — | |
| 23 | CNMA120408 | 32.0 | 0.45 | 0.80 | 8 | 10.0 | −0.4 | −0.4 | |
| 24 | CNMA120408 | 32.0 | 0.50 | 0.80 | 13 | 3.1 | −0.6 | −0.5 | |
| 25 | CNMA120408 | 32.0 | 0.70 | 0.70 | 25 | 2.4 | −0.7 | −0.5 | |
| 26 | CNMA120408 | 32.0 | 0.80 | 0.80 | 27 | 2.2 | −0.7 | −0.5 | |
| 27 | CNMA120408 | 32.0 | 0.95 | 0.80 | 25 | 2.5 | −0.6 | −0.5 | |
| 28 | CNMA120408 | 35.0 | 0.75 | 0.80 | 20 | 2.8 | −0.7 | −0.5 | |
| 29 | CNMA120408 | 45.0 | 0.60 | 0.80 | 9 | — | — | — | Chattering developed |
| 30 | CNMA120408 | 32.0 | 0.80 | 0 | 1 | — | — | — | |
| 31 | CNMA120408 | 32.0 | 0.80 | 0.45 | 10 | 9.5 | −0.3 | −0.3 | |
| 32 | CNMA120408 | 32.0 | 0.80 | 0.50 | 18 | 3.5 | −0.5 | −0.4 | |
| 33 | CNMA120408 | 32.0 | 0.80 | 0.70 | 24 | 2.5 | −0.7 | −0.5 | |
| 34 | CNMA120408 | 32.0 | 0.80 | 1.2 | 20 | 2.7 | −0.6 | −0.5 | |
| 35 | CNMA120408 | 32.0 | 0.80 | 1.5 | 20 | 4.5 | −0.5 | −0.5 | |
| 36 | CNMA120408 | 32.0 | 0.80 | 2.0 | 2 | — | — | — | |
| 37 | CNMA120404 | 32.0 | 0.80 | 0.80 | 23 | 2.3 | −0.7 | −0.5 | |
| 38 | CNMA120416 | 32.0 | 0.80 | 0.80 | 24 | 2.2 | −0.7 | −0.5 | |
| 39 | Bite type | 32.0 | 0.80 | 0.80 | 27 | 2.2 | −0.6 | −0.5 | |

*1

Tool Nos. 1 to 10 are inserts including cutting tips each comprising a cBN-based sintered body brazed to a corner thereof (tools with conventional arcuate noses). Each cutting tip has an arcuate nose having a radius of curvature in the range of 0.4 to 2.0 mm, and has, along the cutting edge, a chamfer parallel to the cutting edge and having a constant width CW of 0.15 to 0.4 mm and a chamfer angle γ of 25 to 45 degrees.

Tool Nos. 11 and 12 are inserts including cutting tips each comprising a cBN sintered body brazed to the substrate (conventional wiper tools). Each cutting tip has an arcuate nose having a radius of curvature R of 0.8 mm, and a chamfer identical to the chamfer of any of the tool Nos. 1 to 10, and further includes a wiper edge having a wiper width WW of 0.5 mm.

Tool Nos. 1 to 38 are tools including alternately usable cutting tips comprising cBN-based sintered bodies fixed to a 25 mm square rod-shaped steel holder by a pin-lock type clamp mechanism. Tool No. 39 is a tool including cutting tips comprising cBN-based sintered bodies directly brazed to a 25 mm square rod-shaped steel shank. Any of the tools was mounted on a lathe so that the length of its portion protruding from the lathe turret to its tip is 40 mm.

The cBN-based sintered bodies were brazed to the substrate through activated brazing filler comprising 72 wt % of Ag, 25 wt % of Cu and 3 wt % of Ti.

*2

The surface roughness of the cut surface (hereinafter simply "surface roughness") and the residual stress on the cut surface (hereinafter simply "residual stress") were measured for tool specimens which were free from chipping five minutes after the start of cutting.

The surface roughness shown is the ten point height of irregularities (RZ) under JIS B0601, which was measured in the axial direction of the workpiece with the cutoff at 0.8 micrometers and the reference length at 4 mm.

The residual stress is a residual stress value measured at the depth of 20 micrometers from the surface by a microscopic X-ray stress measuring device and by etching using chemical treatment. The symbol "−" in Table 1 indicates that compressive stresses remained.

The results of the test on Examples 1 are shown in Table 1.

Summary Evaluation

Among the tool Nos. 13 to 39, which all have a negative land, CBN cutting tools according to the present invention (Nos. 13-17, 19-21, 24-28, 32-35 and 37-39), which were used with the downward distance h set to not less than 0.5 mm and not more than 1.5 mm, showed superior results in any of the life span to tool breakage, surface roughness and residual stress. Among them, tools which were used with the downward distance h set to 0.7 to 1.2 mm achieved particularly superior surface roughness.

Tool Nos. 30 and 31 achieved poor surface roughness because of a large gap present between a wiper edge formed by a three-dimensionally displaced ridgeline and the cut surface of the workpiece.

From the data in Table 1 regarding tool Nos. 13-17, 19-21, 24-28, 32-35 and 37-39, it is apparent that the CBN cutting tools according to the present invention, of which the downward inclination angle β of the ridgeline as the end cutting edge was not less than 20 degrees and not more than 35 degrees, and particularly tools of which the downward inclination angle β was in the range of 25 to 35 degrees, achieved superior surface roughness. Tool Nos. 18 and 29, of which the downward inclination angle β was 45 degrees, suffered a short life span due to chipping of the cutting edge resulting from large cutting resistance and unstable cutting.

Tools according to the present invention, of which the negative land has a width W of not less than 0.5 mm and not more than 2.0 mm, particularly the tools of which the negative land has a width W of 0.5 to 1.5 mm (No. 14-17, 19, 20, 24-28, 32-34 and 37-39) showed superior results in terms of the life span, surface roughness and residual stress, compared to conventional tool Nos. 1 to 12. In tool No. 22, of which the negative land has a width W of 3.0 mm, because the downward distance from the rake face to the apex P of the arcuate nose is large, the cutting tips, each comprising a cBN-based sintered body, has a reduced thickness, and thus reduced strength, which resulted in immature chipping of the cutting tips. In tool No. 23, of which the negative land has a width W of 0.45 mm, because the downward distance from the rake face to the apex P of the nose is insufficient, cutting was performed even at portions beyond the point Q1, so that the surface roughness was not good, and chipping of the cutting edge occurred at a relatively early stage of use of the tool.

The thicker the cBN-based sintered body, the higher its strength. But if it is thicker than 1.5 mm, the amount of cBN, which is an expensive material, unduly increases. Also, when forming the tool, it is difficult to grind such a thick cBN-based sintered body. Thus, in view of the manufacturing cost, its thickness is preferably not more than 1.5 mm.

The CBN cutting tools according to the present invention produced large residual compressive stresses compared to conventional tool Nos. 1 to 12. In particular, residual compressive stresses in the axial direction (feed direction of the tool) of the cut surface of the workpiece were remarkable. This is presumably because, unlike conventional chamfer shapes and wiper shapes, the cutting tips of the tools according to the present invention are shaped such that they reveal strong burnishing action in the feed direction of the tool.

In the case of conventional tool Nos. 1 to 12, not only the cutting tips comprising cBN-based sintered bodies but also their substrates made of cemented carbide have to be subjected to chamfering and honing. In contrast, in the case of the CBN cutting tools according to the present invention, grinding or honing is necessary only on the cutting tips to form the negative land. Thus, the cutting tools according to the present invention are more advantageous than conventional tools in terms of productivity and manufacturing cost, too.

EXAMPLES 2

Tool Nos. 41 to 56 shown in Table 2 were prepared. The tools used are based on diamond-shaped inserts classified into CNMA120412, CNMA120416 and CNMA120420 under ISO, which carry alternately usable cutting tips and have an apex angle α of 80 degrees. Each cutting tip comprises a cBN-based sintered body (of the same composition as the sintered bodies of Examples 1) having a base length of 4 mm and a thickness of 1.1 mm, and a back metal layer made of cemented carbide and joined to the sintered body by sintering. The cutting tips were joined to a substrate of cemented carbide by brazing their base metal layers to the substrate. Different kinds of chamfers and flat negative lands similar to those in Examples 1 were formed on the cBN-based sintered bodies of the cutting tips. The cutting tips were brazed to the substrate of cemented carbide through activated brazing filler comprising 50 wt % of Cu, 25 wt % of Ti and 25 wt % of Zr.

After brazing the cutting tips to the substrate of each tool, a rake face and an arcuate nose were formed on each cBN-based sintered body by grinding. Then, a chamfer and a negative land were formed to define cutting edges. Before forming the chamfer and the negative land, the cBN-based sintered bodies of tool No. 56 had a thickness of 0.7 mm, and those of all the other tools had a thickness of 0.8 mm. For the tools having noses having four different radii of curvature of 0.8 mm, 1.2 mm, 1.6 mm and 2.0 mm, the brazing areas of the bottoms of the cutting tips were 3.15 $mm^2$, 2.90 $mm^2$, 2.55 $mm^2$ and 2.10 $mm^2$, respectively.

The tools were used as shown in FIG. 7 under the same conditions with the cutting edge inclination angle λ, side rake angle γn, end clearance angle αof, side clearance angle αos, end cutting edge angle κf, and side cutting edge angle κs set to −5 degrees, −5 degrees, 5 degrees, 5 degrees, 5 degrees and −5 degrees, respectively. The downward distance h of the ridgeline which is used as the end cutting edge, the width W of the negative land, and the downward inclination angle β of this cutting edge were set to values shown in Table 2. Using these tools, the following workpiece was cut under the following conditions.

Workpiece: JIS type: SCR415H end surface machining (DIN type: equivalent to 15Cr3); Hardness HRc 58 to 60

Cutting velocity: V=120 m/min

Depth of cut: d=0.25 mm

Feed rate: f=0.1-0.6 mm/rev

Type of machining: Continuous machining of the end surface of a disk, with no coolant The results of an evaluation test are also shown in Table 2.

TABLE 2

| Specimen No. No. | Tool shape | Downward inclination angle β ° | Width W of negative land mm | Downward distance h mm | Number of workpieces cut to tool breakage due to flaking | Surface roughness Rz μm | Feed mm/rev. | Remarks |
|---|---|---|---|---|---|---|---|---|
| 41 | CNMA120408 | 0 | — | 0 | 3 | 11.0 | 0.3 | γ: 25°, CW: 0.15 mm |
| 42 | CNMA120412 | 0 | — | 0 | 9 | 10.5 | 0.3 | γ: 25°, CW: 0.15 mm |
| 43 | CNMA120412 | 0 | — | 0 | 9 | 3.6 | 0.08 | γ: 25°, CW: 0.15 mm |
| 44 | CNMA120412 | 0 | — | 0 | 9 | 5.0 | 0.15 | γ: 25°, CW: 0.15 mm |
| 45 | CNMA120416 | 0 | — | 0 | 7: Separation of brazing | 8.0 | 0.3 | γ: 25°, CW: 0.15 mm |
| 46 | CNMA120420 | 0 | — | 0 | 3: Separation of brazing | 7.0 | 0.3 | γ: 25°, CW: 0.15 mm |
| 47 | CNMA120412 | 0 | — | 0 | 0.5 | — | 0.3 | γ: 40°, CW: 0.15 mm |
| 48 | CNMA120412 | 0 | — | 0 | 9 | — | 0.3 | WW: 0.5, γ: 25°, CW: 0.15 mm |
| 49 | CNMA120412 | 26.0 | 1.0 | 0.70 | — | 10.5 | 0.08 | Chattering developed from the beginning |
| 50 | CNMA120412 | 26.0 | 1.0 | 0.70 | 28 | 2.8 | 0.10 | |
| 51 | CNMA120412 | 26.0 | 1.0 | 0.70 | 35 | 2.9 | 0.12 | |
| 52 | CNMA120412 | 26.0 | 1.0 | 0.70 | 33 | 3.0 | 0.15 | |
| 53 | CNMA120412 | 26.0 | 1.0 | 0.70 | 25 | 3.5 | 0.3 | |
| 54 | CNMA120412 | 26.0 | 1.0 | 0.70 | 20 | 3.6 | 0.5 | |
| 55 | CNMA120412 | 26.0 | 1.0 | 0.70 | 6: Separation of brazing | 3.8 | 0.6 | |
| 56 | CNMA120412 | 26.0 | 1.0 | 0.70 | 20 | 3.0 | 0.15 | |

*1

Tool Nos. 41 to No. 47 are inserts including cutting tips each comprising a cBN-based sintered body brazed to a corner thereof (tools with conventional arcuate noses). They have arcuate noses having radii of curvature in the range of 0.8 to 2.0 mm, and have, along the cutting edge, a chamfer parallel to the cutting edge and having a constant width CW of 0.15 mm and a chamfer angle γ of 25 degrees.

Tool No. 48 is an insert including cutting tips each comprising a cBN sintered body brazed to the substrate (conventional wiper tool). Each cutting tip has an arcuate nose having a radius of curvature R of 1.2 mm, and a chamfer identical to the chamfer of any of the tool Nos. 41 to 47, and further includes a wiper edge having a wiper width WW of 0.5 mm.

Tool Nos. 49 to 55 are tools including alternately usable cutting tips comprising cBN-based sintered bodies fixed to a 25 mm square rod-shaped steel holder by a pin-lock type clamp mechanism as in Examples 1. Any of the tools was mounted on a lathe so that the length of its portion protruding from the lathe turret to its tip is 40 mm.

*2

The surface roughness of cut surfaces was measured for tools which were free from chipping of the cutting edge after two workpieces had been cut. The surface roughness was measured in terms of Rz as in Examples 1.

Summary Evaluation

When cutting hardened steel having high hardness, extremely large radial force acts on the cutting edge of the tool. Especially when such hardened steel is cut discontinuously at a high feed rate with a large depth of cut as in Examples 2, such large radial force acts impulsively on the cutting edge of the tool, so that the rake face of the tool tends to suffer flaking (seashell-like flakes are produced). Chippings observed in tool Nos. 41 to 56 in Table 2 were all such seashell-like flakes.

It would be possible to extend the life span of even such conventional tools when used in high-feed, high-efficiency cutting by increasing the radius of curvature of the nose of each cutting tip. But if the nose has too large a radius of curvature, the brazing area of the cutting tip has to be correspondingly reduced, which increases the possibility of breakage of the brazing joint portion if the cutting tip is subjected to high cutting resistance during cutting at a high feed rate (see the results for tool Nos. 45 and 46).

Tool No. 47, of which the chamfer angle γ was 40 degrees, suffered chipping of the cutting edge in the initial stage of cutting before the separation of the brazing joint portion, and thus its life was short. This is presumably because due to the large chamfer angle γ, no sharp cutting was possible, so that the cutting resistance increased.

The wiper tool having the wiper edge, i.e. tool No. 48 suffered from flaking as with tool Nos. 41 to 46, though there was no separation of brazing.

In contrast, the tools according to the present invention, i.e. tool Nos. 50-54 and 56 suffered no separation of brazing even when cutting was performed in a wide range of high feed rates of 0.15 mm/rev to 0.5 mm/rev. Also, flaking scarcely occurred. As in Examples 1, the wiper edge formed due to three-dimensional displacement of the cutting edge provided good surface roughness.

The reason why the tools according to the present invention, i.e. tool Nos. 50-54 and 56 scarcely suffered chipping, i.e. flaking is presumably because when large radial force acts impulsively on the cutting edge of the tool, the negative land serves to apply large compressive stresses as a reaction to the formation of chips to the cutting edge both in the direction of the principal cutting force (normal direction of the rake face) and the tool feed direction, and the compressive stresses cancel tensile stresses applied to the brittle cBN-based sintered body in the direction of the principal cutting force due to the impulsive radial force.

Tool No. 55 suffered separation of the brazed cutting tips. Also, it was inferior in surface roughness to tool Nos. 50 to 54. This is because the feed rate was too harsh, i.e. 0.6 mm/rev.

Tool No. 49 was inferior in surface roughness to conventional tools due to chattering that had developed from the beginning of cutting. This is presumably because while the feed rate is low, e.g. 0.08 mm/rev, natural oscillations occurred due to specific shapes of the tools according to the present invention. The tools according to the present invention are therefore preferably used at a feed rate of 0.1 to 0.5 mm/rev, more preferably 0.12 to 0.5 mm/rev, and further preferably 0.15 to 0.5 mm/rev for higher machining efficiency.

Tool No. 56 showed improved resistance to chipping and surface roughness compared to conventional tool No. 44. But tool No. 52, which is higher in rigidity because its cBN-based sintered bodies have a thickness of 0.8 mm, showed further improved resistance to chipping compared to tool No. 56.

EXAMPLES 3

Tool Nos. 61 to 71 shown in Table 3 were prepared. The tools used are based on diamond-shaped inserts classified in classes D (apex angle α=55 degrees), T (apex angle α=60 degrees), C (apex angle α=80 degrees) and S (apex angle α=90 degrees) under ISO, which carry alternately usable cutting tips. Each cutting tip comprises a cBN-based sintered body (of the same composition as the sintered bodies of Examples 1), and a back metal layer made of cemented carbide and joined to the sintered body by sintering. The cutting tips were joined to a substrate of cemented carbide by brazing their base metal layers to the substrate. Different kinds of chamfers and negative lands shown in FIGS. 1, 5 and 6 were formed on the cBN-based sintered bodies of the cutting tips.

On the surface of tool No. 67, including the substrate surface, after forming a negative land along the cutting edge of each cutting tip, a hard film of $(Ti_{0.5}Al_{0.5})N$ was formed to the thickness of 3 micrometers by PVD (arc ion plating).

After brazing the cutting tips to the substrate of each tool, a rake face and an arcuate nose were formed on each cBN-based sintered body by grinding. Then, a chamfer and a negative land were formed to define cutting edges. Before forming the chamfer and the negative land, the cBN-based sintered bodies of any of the tools had a thickness of 1.2 mm. The brazing area of the bottom of the cutting tips was 2.90 mm². The cutting tips were brazed to the respective substrates of cemented carbide through an activated brazing filler of the same composition as the brazing filler used in Examples 2.

The tools were used as shown in FIG. 7 with the cutting edge inclination angle λ, side rake angle γn, end clearance angle αof, side clearance angle αos, end cutting edge angle κf, and side cutting edge angle κs set to (−7 degrees, −5 degrees, 7 degrees, 5 degrees, 32 degrees and −3 degrees), respectively, for the type D tools, (−6 degrees, −6 degrees, 6 degrees, 6 degrees, 15 degrees and −15 degrees), respectively, for the type T tools, (−5 degrees, −5 degrees, 5 degrees, 5 degrees, 5 degrees and −5 degrees), respectively, for the type C tools, and (−5 degrees, −6 degrees, 5 degrees, 6 degrees, 15 degrees and 15 degrees), respectively, for the type S tools. For any of the tools, the noses had a radius of curvature of 0.8 mm. The downward distance h of the ridgeline which is used as the end cutting edge, the width W of the negative land, and the downward inclination angle β of this cutting edge were set to values shown in Table 3. Using these tools, the following workpiece was cut under the following conditions.

Workpiece: JIS type: SCR415H end surface machining (DIN type: equivalent to 15Cr3); Hardness HRc 48 to 60 (the hardness changes (decreases) inwardly from the surface with the hardness at the depth of cut of 1 mm being HRc 48)

Cutting velocity: V=100 m/min

Depth of cut: d=1.0 mm

Feed rate: f=0.2 mm/rev

Type of machining: Composite machining with the area ratio between the radially outer surface and the end surface set to 1:1 (for removing a carburized layer) (It is necessary that the boundary between the radially outer surface and the end surface be an arcuate surface having a radius of curvature of not more than 0.8 mm. An emulsion type coolant diluted to 20 times was used.)

The results of an evaluation test are shown in Table 3.

TABLE 3

| Specimen No. | Tool No. | Tool shape | Shape of negative land | Downward inclination angle β ° | Width W of negative land mm | Downward distance h mm | Cutting time to tool breakage min | Amount of wear of flank μm | Surface roughness Rz μm | Chip length mm | Remarks |
|---|---|---|---|---|---|---|---|---|---|---|---|
| 61 | | DNMA150408 | — | 0 | — | 0 | 20 | 0.090 | 7.0 | 300 | γ: 25°, CW: 0.15 mm |
| 62 | | DNMA150408 | Flat | 29.0 | 1.10 | 0.80 | 60 | 0.093 | 3.5 | 60 | |
| 63 | | TNMA160408 | — | 0 | — | 0 | 18 | 0.087 | 8.0 | 290 | γ: 25°, CW: 0.15 mm |
| 64 | | TNMA160408 | Flat | 28.0 | 1.10 | 0.80 | 65 | 0.086 | 3.5 | 60 | |
| 65 | | CNMA120408 | — | 0 | — | 0 | 22 | 0.090 | 7.2 | 295 | γ: 25°, CW: 0.15 mm |
| 66 | | CNMA120408 | Flat | 24.0 | 1.10 | 0.80 | 70 | 0.090 | 3.5 | 50 | |
| 67 | | CNMA120408 | Flat | 24.0 | 1.10 | 0.80 | 100 | 0.050 | 3.5 | 55 | PVD coating |
| 68 | | CNMA120408 | Curved | 24.0 | 1.10 | 0.80 | 75 | 0.092 | 3.0 | 45 | |
| 69 | | CNMA120408 | Multifaceted | 24.0 | 1.10 | 0.80 | 80 | 0.090 | 3.0 | 40 | |
| 70 | | SNMA120408 | — | 0 | — | 0 | 22 | 0.085 | 8.0 | 310 | γ: 25°, CW: 0.15 mm |
| 71 | | SNMA120408 | Flat | 22.0 | 1.10 | 0.80 | 70 | 0.085 | 3.5 | 60 | |

*1

Tool Nos. 61, 63, 65 and 70 are inserts including cutting tips each comprising a cBN-based sintered body of a conventional shape and brazed thereto. Each cutting tip has a nose having a radius of curvature of 0.8 mm, and has, along the cutting edge, a chamfer having a width CW of 0.15 mm and a chamfer angle γ of 25 degrees (conventional tools and Comparative Examples).

Tool No. 67 carries cutting tips having the same specs as the cutting tips of tool No. 66. But on the surface of tool No. 67, including the substrate surface, a hard film of $(Ti_{0.5}Al_{0.5})N$ is formed by PVD.

Tools in Table 3 are tools including alternately usable cutting tips comprising cBN-based sintered bodies fixed to a 25 mm square rod-shaped steel holder by a pin-lock type clamp mechanism. Any of the tools was mounted on a lathe so that the length of its portion protruding from the lathe turret to its tip is 40 mm.

*2

The surface roughness of cut surfaces was measured for tools which were free from chipping of the cutting edge after two workpieces had been cut. The surface roughness was measured in terms of Rz as in Examples 1.

The length of chips is the length of chips collected 5 minutes after the start of cutting.

Summary Evaluation

In Examples 3, due to the specific shape of the workpiece at the boundary between its radially outer surface and end surface, the radius of curvature of the arcuate nose is restricted to not more than 0.8 mm. But because cutting is high-efficiency cutting at a high feed rate, conventional tool Nos. 61, 63, 65 and 70 suffered chipping due to increased feed component of the cutting force. Their life spans were thus short.

In contrast, any of tool Nos. 62, 64, 66-69 and 71 according to the present invention showed marked improvement in the resistance to chipping. This is presumably because, as in Examples 2, the negative land serves to apply large compressive stresses as a reaction to the formation of chips to the cutting edge both in the direction of the principal cutting force and the tool feed direction, and the compressive stresses cancel tensile stresses resulting from the thrust force.

Tool Nos. 68 and 69, of which the negative land comprises two surfaces that are symmetrical with respect to the bisector of the apex α of the nose and inclined in opposite directions to each other so that its central portion protrudes toward the apex of the nose, showed further improved cutting abilities compared to tools having a flat negative land (tool Nos. 62, 64, 66 and 67).

According to the present invention, the negative land prevents thick and continuous chips from tangling with the workpiece or the tool, which was a big problem when turning a hardened steel workpiece at a high feed rate with a large depth of cut as in Examples 3. Specifically, while conventional tool Nos. 61, 63, 65 and 70 produced long chips of about 300 mm, the tools according to the present invention produced much shorter (less than 60 mm) and thus more easily disposable chips. Thus, the tools according to the present invention will serve to improve the operating ratio of facilities for e.g. mass-production of vehicle parts and reduce defectives.

Tool No. 67, which is identical to tool No. 66 except that its surface is coated with a TiAlN film, showed a marked reduction in the wear of the flanks, and thus a prolonged life span.

According to the present invention, each cBN-based sintered body has a negative land formed between the rake face and the arcuate nose to define cutting edges on both sides thereof whose position changes three-dimensionally. This makes it possible to form a high-strength obtuse cutting edge having the burnishing function both in the rotational direction of the workpiece and the tool feed direction while the workpiece is being turned. Further, by arranging the tool such that the end cutting edge forms a downward inclination angle and the apex of the nose is downwardly spaced from the rotation axis of the workpiece, which is generally inconceivable, a wiper edge is formed on the end cutting edge. This makes it possible to perform high-efficiency machining at a high feed rate, and high-precision machining, which was impossible with conventional cutting tools because high-efficiency machining and high-precision machining are generally considered to be contradictory to each other, and also to stably achieve a long life span of the tool. By high-precision machining, the machined surface of the workpiece shows improved fatigue strength, and the fitting portion of the workpiece shows improved sealability.

The tool according to the present invention can be especially advantageously used for high-efficiency turning of a hardened steel workpiece, but can also be advantageously used to cut a sintered alloy, which is one of workpieces that are difficult to cut.

What is claimed is:

1. A CBN cutting tool for high-quality, high-efficiency cutting comprising cutting portions formed by cBN-based sintered bodies, characterized in that each of said cBN-based sintered bodies has an end flank, a side flank, an arcuate nose, a rake face and a negative land formed between said rake face and said arcuate nose, said negative land and said rake face defining a ridgeline therebetween which extends from point Q1 at which said end flank, rake face and negative land intersect each other to point Q2 at which said side flank, rake face and negative land intersect each other, said end flank and said negative land defining a first cutting edge therebetween, said side flank and said negative land defining a second cutting edge therebetween, said first and second cutting edges extending from an apex P of said arcuate nose to points Q1 and Q2, respectively, said first and second cutting edges being the lowest relative to said rake face at said apex P and rising toward points Q1 and Q2, respectively, and wherein a straight line connecting said apex P and point Q1 forms an inclination angle β' of not less than 20 degrees and not more than 35 degrees with respect to said rake face.

2. The CBN cutting tool for high-quality, high-efficiency cutting of claim 1 wherein said arcuate nose has a radius of curvature of not less than 0.4 mm and not more than 1.6 mm, and an apex angle α of 55 to 90 degrees.

3. The CBN cutting tool for high-quality, high-efficiency cutting of claim 1 or 2 wherein said negative land has a width W of not less than 0.5 mm and not more than 2.0 mm.

4. The CBN cutting tool for high-quality, high-efficiency cutting of claim 2 or 3 further comprising a substrate made of cemented carbide and having a plurality of corners, each of said cBN-based sintered bodies being retained on one of said corners, whereby said cBN-based sintered bodies can be alternately used for cutting, said nose of each of said cBN-based sintered bodies having a radius of curvature of not less than 0.8 mm and not more than 1.2 mm, said inclination angle β' being not less than 25 degrees and not more than 32 degrees, said negative land having a width W of not less than 0.5 mm and not more than 1.5 mm.

5. The CBN cutting tool for high-quality, high-efficiency cutting of any of claims 1 to 4 wherein said first and second cutting edges are symmetrical with respect to a bisector of the apex angle a of said arcuate nose.

6. The CBN cutting tool for high-quality, high-efficiency cutting of any of claim 5 wherein said negative land is symmetrical with respect to the bisector of the apex angle a of said arcuate nose, and comprises two surfaces that are inclined in opposite directions to each other relative to said bisector.

7. A method of turning a workpiece having a rotation axis using the CBN cutting tool of any of claims 1 to 6, wherein the CBN cutting tool is cut into the workpiece at a feed rate of not less than 0.1 mm/rev and not more than 0.5 mm/rev with the CBN cutting tool positioned such that the cutting edge inclination angle and the side rake angle are both negative, the end clearance angle, side clearance angle and end cutting edge angle are all positive, the downward inclination angle β of said first cutting edge used as the end cutting edge is 20 to 35 degrees with respect to said rake face, and said apex P is spaced downwardly by not less than 0.5 mm and not more than 1.5 mm from a plane parallel to said rake face and containing the rotation axis of the workpiece.

8. The method of claim 7 wherein a radially outer surface of the workpiece is turned with said apex P spaced downwardly by not less than 0.7 mm and not more than 1.2 mm from said plane at a feed rate of not less than 0.15 mm/rev and not more than 0.5 mm/rev.

9. The method of claim 7 or 8 wherein said workpiece is hardened steel.

* * * * *